United States Patent [19]
Rozman

[11] Patent Number: 5,587,641
[45] Date of Patent: Dec. 24, 1996

[54] VSCF START SYSTEM WITH PRECISE VOLTAGE CONTROL

[75] Inventor: Gregory I. Rozman, Rockford, Ill.

[73] Assignee: Sundstrand Corporation, Rockford, Ill.

[21] Appl. No.: 504,102

[22] Filed: Apr. 2, 1990

Related U.S. Application Data

[63] Continuation of Ser. No. 279,863, Dec. 5, 1988, abandoned.

[51] Int. Cl.$^6$ .................................................. H02P 7/00
[52] U.S. Cl. ........................ 318/801; 318/439; 318/808
[58] Field of Search .................................. 318/798–815, 318/254, 439, 138, 721, 722, 723

[56] References Cited

U.S. PATENT DOCUMENTS

| | | | |
|---|---|---|---|
| 3,787,724 | 1/1974 | Pedersen et al. | 318/722 |
| 4,330,741 | 5/1982 | Nagase et al. | 318/803 |
| 4,460,861 | 7/1984 | Rosa | 318/722 |
| 4,480,299 | 10/1984 | Muto et al. | |
| 4,523,267 | 6/1985 | Mehl | |
| 4,524,310 | 6/1985 | Nagase et al. | 318/808 |
| 4,546,293 | 10/1985 | Peterson et al. | |
| 4,608,527 | 8/1986 | Glennon et al. | 318/685 |
| 4,633,382 | 12/1986 | Upadhyay et al. | |
| 4,651,419 | 9/1977 | Takahashi | 318/721 |
| 4,713,596 | 12/1987 | Bose | 318/802 |
| 4,751,438 | 6/1988 | Markunas | 318/254 |
| 4,757,434 | 7/1988 | Kawabata et al. | |
| 4,792,742 | 12/1988 | Fujimoto et al. | 318/800 |
| 4,818,890 | 4/1989 | Mose et al. | 318/802 |

OTHER PUBLICATIONS

Le–Huy et al, "A Self–Controlled Synchronous Motor Drive Using Terminal Voltage Sensing" Conference–IAS Annual Meeting 1980, Cincinnati, OH, USA, 28 Sep.–3 Oct., 1980.

Primary Examiner—Jonathan Wysocki
Attorney, Agent, or Firm—Wood, Phillips, VanSanten, Hoffman & Ertel

[57] ABSTRACT

The problem of maintaining precision control of a synchronous motor is solved in a motor start control which utilizes an estimate of the amplitude of the fundamental wave component as a feedback value. The motor receives power from a main inverter and an excitation inverter. The inverters are controlled by a control unit which includes a pulse width modulation generator which is responsive to a voltage command and a commutation command to develop switching signals for controlling the switches in the main inverter. At speeds above a preselected minimum speed, the voltage command is developed in a closed loop manner responsive to a feedback signal representing an estimate of the fundamental output of the main inverter.

2 Claims, 6 Drawing Sheets

VSCF START SYSTEM WITH PRECISE VOLTAGE CONTROL

This application is a continuation of U.S. patent application Ser. No. 279,863, filed Dec. 5, 1988, now abandoned.

FIELD OF THE INVENTION

This invention relates to electrical power systems and more particularly to a dual mode control system therefor including a generate mode of operation and a start mode of operation.

BACKGROUND OF THE INVENTION

Conventional electrical power systems utilize a synchronous electrical generator for generating AC power. Particularly, such a generator may include a rotor and a stator having a stator coil. In applications such as an aircraft, the rotor is driven by an engine so that electrical power is developed in the stator coil. Owing to the variation in engine speed, the frequency of the power developed in the generator windings is similarly variable. This variable frequency power is converted to constant frequency power in a variable speed constant frequency (VSCF) system including a power converter which may develop, for example, 115/200 Vac power at 400 Hz. Such known converters are controlled by a generator/converter control unit (GCCU).

In order to provide aircraft engine starting, such known power systems have operated the generator as a motor. Specifically, an external power source is coupled through a start control to the generator to energize the stator coil and thus develop motive power to start the engine. The components required in such a start control increase the weight of the aircraft and take up valuable space. To minimize the size and weight of such start controls, certain known aircraft VSCF power systems have utilized the existing converter and GCCU for the start control.

In the start mode of operation, the converter may be supplied power from any 400 Hz power source, such as, for example, an auxiliary power unit generator or an external power source. However, each such power source might have a different available capacity for use in engine starting. Therefore, the GCCU must be configured to provide engine starting from any such available power sources and to limit the amount of power drawn.

Rozman et al. co-pending application entitled VSCF Start System with Selectable Input Power Limiting, U.S. patent application Ser. No. 270,625, filed Nov. 14, 1988, now U.S. Pat. No. 4,949,021, and owned by the assignee of the present invention, which is hereby incorporated by reference herein, discloses a start control which provides input power limitations in accordance with input power requirements. Specifically, the start control described therein utilizes a pulse width modulated inverter to control torque and power as functions of the output voltage and commutation angle. Specifically, the start control maintains the volts/hertz ratio at a constant and uses closed loop control of the commutation angle at speeds above a preselected minimum to control current and to limit input power.

Such a start control system utilizes open loop voltage control which assumes that the constant volt/hertz ratio is maintained. In fact, voltage may increase or decrease if the power source is not accurate.

When driving a synchronous motor at various frequencies, it is important to maintain a constant volt/hertz ratio. If this ratio is too high, then the motor may saturate. If the ratio is too low, then the motor develops less torque and less power.

Conventional voltage control schemes implement closed loop control by detecting inverter output voltage and correcting the PWM signal by the difference between this voltage and a voltage reference. However, higher harmonic components in the inverter output limit the accuracy of such schemes. Particularly, the armature component of the magnetic flux is generated by the fundamental component of the output voltage and the higher harmonics detrimentally affect the desired control scheme.

The present invention is intended to overcome one or more of the problems as set forth above.

SUMMARY OF THE INVENTION

In accordance with the present invention, a motor start control system is operable to precisely control voltage using an estimate of motor voltage.

Broadly, there is disclosed herein a motor voltage estimator for a motor having a rotor and stator having a stator coil which is controllably energized responsive to a voltage command and a commutation angle command for imparting rotation to the rotor. The estimator includes means for receiving a commutation angle command, first sensing means for sensing the speed of rotational movement of the rotor, and second sensing means for sensing current through the stator coil. Means are coupled to the receiving means and the first and second sensing means for developing a signal representing an estimation of voltage across the stator coil responsive to the commutation angle command, the rotor speed and the stator current.

Specifically, motor terminal voltage can be estimated utilizing basic relationships between terminal voltage and torque angle. At unity power factor operation, the torque angle is equal to the commutation angle.

More specifically, the estimated fundamental output voltage is determined in accordance with basic relationships which use motor speed, motor armature current, armature resistance, quadrature axis synchronous inductance, and torque angle as variables.

The disclosed motor control system is used for starting an engine using a brushless synchronous generator operating as a motor. The motor receives power from a main inverter and an excitation inverter. The main inverter is controlled by a control unit implementing a closed loop control algorithm using an estimation of the fundamental voltage of the inverter output as a feedback value.

The control unit includes a pulse width modulation (PWM) generator which is responsive to a voltage command and a commutation angle command to develop switching signals for controlling the switches in the main inverter. The voltage command is used to vary the duty cycle of the PWM signal. The commutation angle is used to phase advance the inverter output.

The voltage command is developed utilizing a control loop having a speed signal converter which converts a rotor position signal into a speed signal, a multiplier which multiplies the speed signal with a constant representing the required relationship of inverter output voltage and frequency, and a summing junction which sums the output of the multiplier with a boost voltage representing the voltage required to offset the IR drop of the motor at low speeds. The signal from the summing junction comprises a voltage reference which is coupled to a second summer. Another input of the second summer is a signal representing the estimated fundamental component amplitude of the main inverter output voltage. The summing junction develops an error signal which is compensated to develop the voltage command which is applied to the PWM generator.

The commutation angle command is derived by summing the armature current with a reference and the resulting error signal is compensated and provided to a summer. The summer sums the compensated error signal with an offset and the resulting signal is limited to obtain the commutation angle command signal which is provided to the PWM generator for controlling the switches in the inverter.

Thus, it is an object of the present invention to provide a motor voltage control for a PWM inverter suitable for precise control of motor operation.

Further features and advantages of this invention will readily be apparent from the specification and from the drawings.

DESCRIPTION OF THE INVENTION

Figure 1:
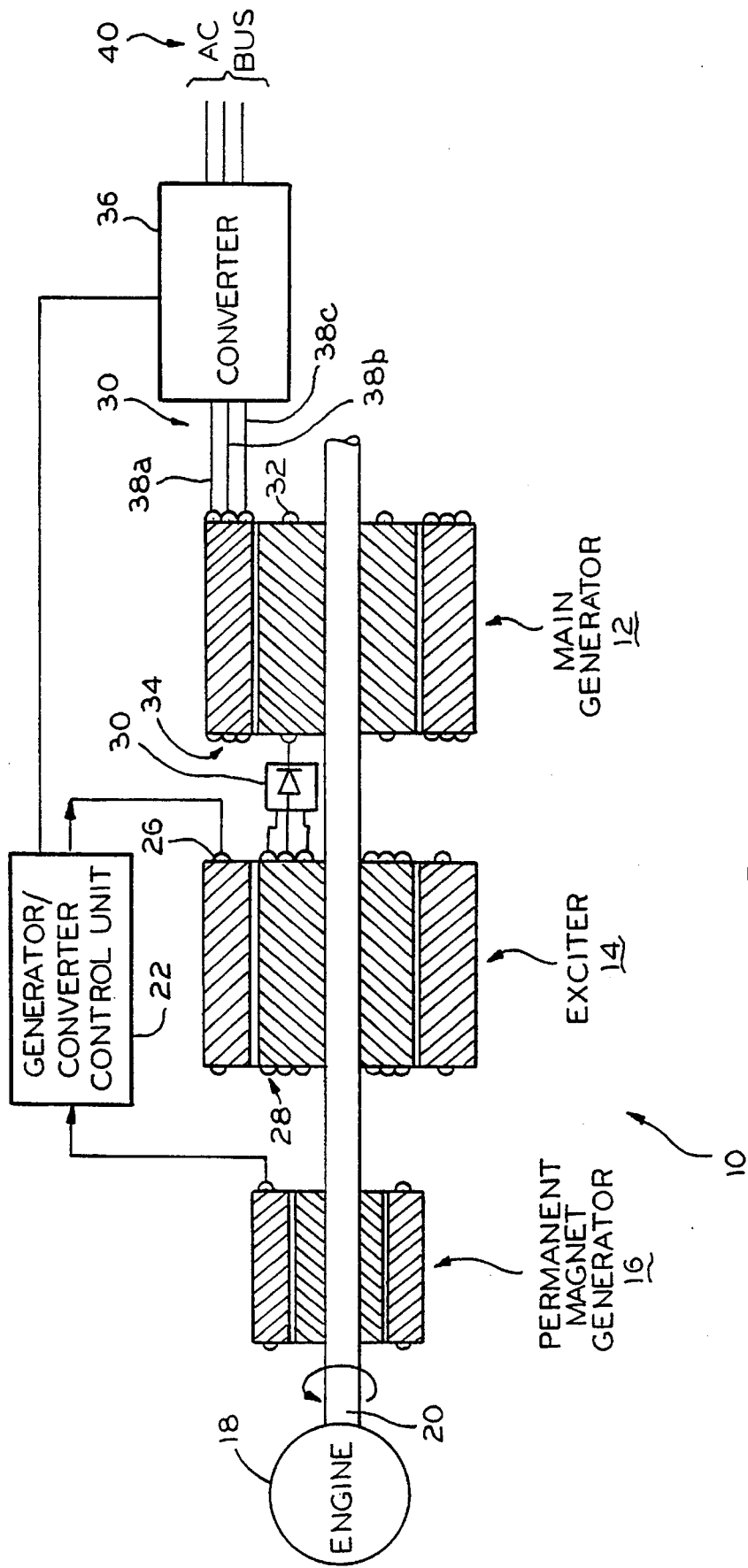
FIG. 1 is a combined diagrammatic illustration-block diagram of an electrical system incorporating the start system of the present invention.

Referring first to FIG. 1, an electrical power system 10 includes a main generator 12, an AC exciter 14 for providing main field current to the generator 12 and a permanent magnet generator (PMG) 16. Each of the main generator 12, exciter 14 and PMG 16 are driven by an engine 18 through a common shaft 20.

A generator/convertor control unit (GCCU) 22 receives the power developed by the PMG and delivers a controlled current to a field winding 26 of the exciter 14. As is conventional in brushless power systems, rotation of the shaft 20 by the engine 18 results in generation of a polyphase voltage in armature windings 28 of the exciter 14. This polyphase voltage is rectified by a rectifier bridge, illustrated generally at 30, and the rectified power is coupled to a field winding 32 of the main generator 12. The current in the field winding 32 and the rotation of the shaft 20 sets up a rotating magnetic field in space occupied by a set of main generator stator windings, comprising a stator coil 34. The stator coil 34 develop polyphase output power which is delivered to a converter 36 over a bus 38 comprising at least three conductors 38a, 38b, and 38c.

In a typical application, the engine 18 is the main engine in an aircraft, and the converter 36 is part of a variable speed constant frequency (VSCF) system for delivering constant frequency power to an AC bus 40 for powering aircraft loads (not shown), as controlled by the GCCU 22.

During engine start, the engine 18 is started using the main generator 12 operating as a motor. Particularly, the main generator 12 receives power from the converter 36 which is controlled by the GCCU 22. For ease of explanation herein, the main generator 12 is referred to as a motor when operated as such in the start mode of operation.

Figure 2:
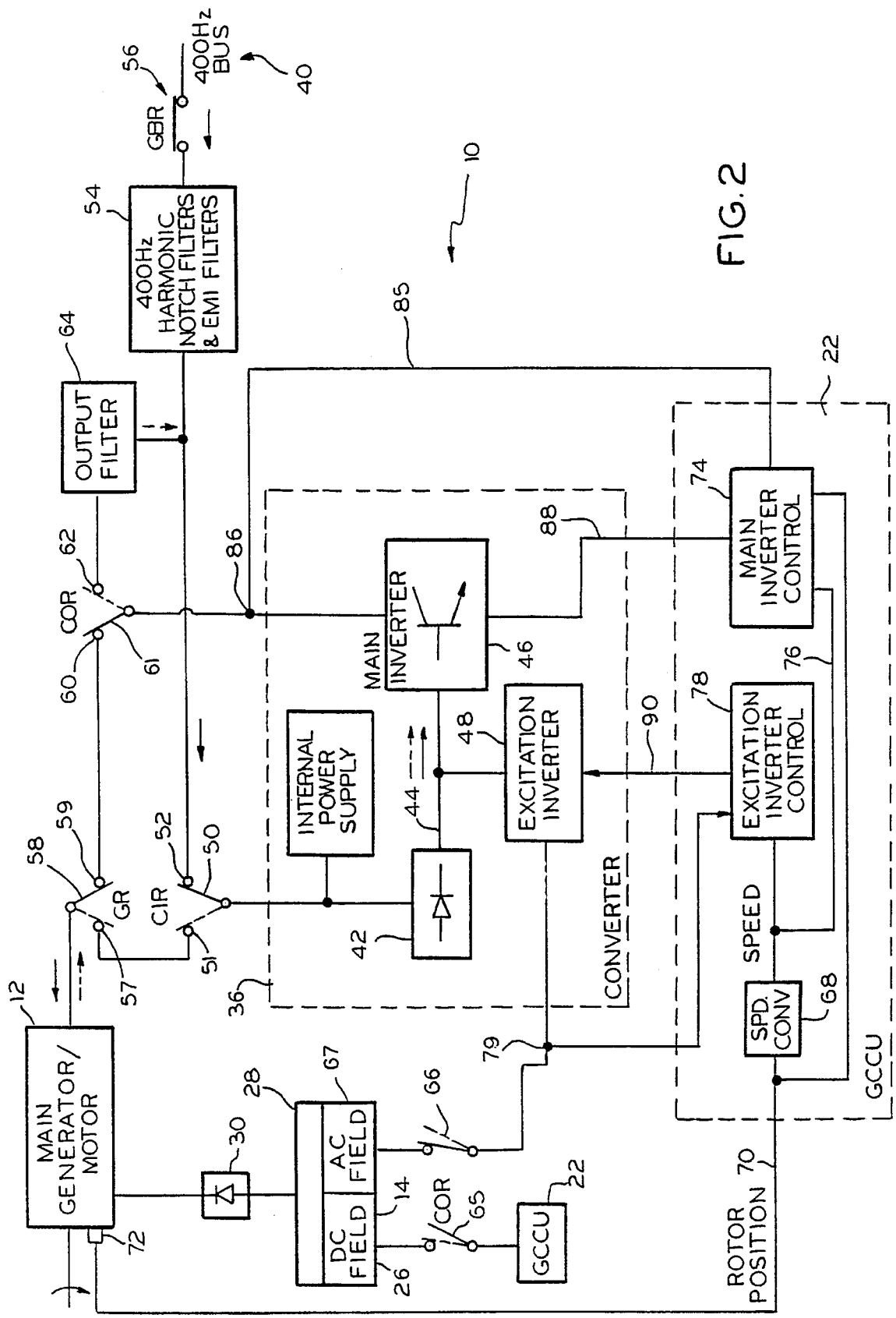
FIG. 2 is a generalized block diagram of the electrical power system including a control system for the generate mode of operation and the start mode of operation.

Referring now to FIG. 2, the electrical power system 10 is illustrated in greater detail in block diagram form.

The converter 36 includes an AC/DC converter 42 connected by a DC link 44 to a DC/AC converter 46. Particularly, according to the illustrative embodiment of the invention, the AC/DC converter 42 comprises a full wave bridge rectifier circuit of conventional construction which is operable to convert three phase AC power to DC power, the DC link 44 includes a conventional filter, and the DC/AC converter 46 comprises a main inverter circuit, described more specifically below relative to FIG. 4. The converter 36 also includes an excitation inverter 48 connected to the DC link 44 for developing AC power for the motor field during the start mode of operation.

The AC side of the rectifier 42 is connected to a movable contact 50 of a converter input relay (CIR). The relay CIR also includes respective first and second fixed contacts 51 and 52. The second fixed contact 52 is connected through a filter circuit 54 and generator bus relay (GBR) 56 to the AC bus 40. The first fixed contact 51 is connected to a first fixed contact 57 of a generator relay (GR). The GR relay also includes a movable contact 58 and a second fixed contact 59. The movable contact 58 is connected to the main generator 12, i.e., to the windings 34 shown in FIG. 1. The second fixed contact 59 is connected to a first fixed contact 60 of a converter output relay (COR). The COR relay also includes a movable contact 61 and a second fixed contact 62. The movable contact 61 is connected to the output of the main inverter 46. The second fixed contact 62 is connected through an output filter 64 to the filter circuit 54. The COR relay also includes respective first and second field control switches 65 and 66. The first switch 65 connects the exciter field winding 26 to the GCCU 22. The second switch 66 connects the excitation inverter 48 to an AC start field winding 67 of the exciter 14. Specifically, the excitation for the wound field main generator/motor 12 cannot be supplied at zero speed by the exciter 14. Accordingly, the excitation inverter 48 and the start field winding 67 are included functioning as a rotary transformer. Specifically, AC power delivered to the exciter AC field winding 67 develops corresponding AC power in the armature windings 28 for powering the motor field winding 32.

During engine start, the relays GR, CIR and COR are operated as shown in solid line in FIG. 2. Conversely, in the generate mode, these relays GR, CIR and COR are operated as shown dashed lines in FIG. 2.

Although the relays GR, CIR and COR are shown as providing a single line connection, each of the relays is provided with suitable switches to switch three phase power, as is well known.

The GCCU 22 includes a speed converter 68 which receives a rotor position signal on a line 70 from a rotor position sensor 72 associated with the main generator 12. The position sensor 72 may be, for example, a conventional resolver. The rotor position signal 70 is also transferred to a main inverter control 74. The speed converter 68 may perform a derivative operation for converting rotor position to a speed signal on a line 76, as is well known. The main inverter control also receives the speed signal on the line 76 from the speed converter 68. The main inverter control 74 develops base drive commands on a line 88 for controlling the main inverter 46. An exciter inverter control 78 also receives the speed signal on the line 76 from the speed converter 68 and a start exciter current signal on a line 80 from an excitation inverter current sensor 79. The exciter inverter control 78 develops base drive commands on a line 90 for driving the switches of the excitation inverter 48.

In the generate mode of operation, with the relay contacts GR, CIR and COR as illustrated in dashed lines, three phase power developed by the main generator 12 is delivered through the GR relay movable contact 58, its first fixed contact 57, through the CIR relay first fixed contact 51 and its movable contact 50 to the rectifier 42. The rectifier 42 converts the three phase AC power to DC power which is transferred over the DC link 44 to the inverter 46 which converts the power to AC power of constant frequency. The constant frequency AC power from the inverter 46 is delivered through the CIR relay movable contact 61 to the second fixed contact 62, through the output filter 64, and the filter 54 to the AC bus 40. Field power is developed by the exciter 14 through the first field control switch 65.

In the start mode of operation, the relays GR, CIR and COR are controlled so that their contacts are positioned as shown solid lines. Particularly, the AC bus 40 is connected to any available power source. The AC power is delivered through the filter 54, to the second fixed contact 52 and movable contact 50 of the CIR relay to the rectifier 42. The AC voltage is then rectified and transferred through the DC link 44 to the main inverter 46 where it is converted to AC power. The AC power from the main inverter 46 is delivered through the movable contact 61 and the first fixed contact 60 of the COR relay, and subsequently through the second fixed contact 59 and movable contact 58 of the GR relay to the stator windings of the main generator/motor 12. Field power to the main generator 12 is provided from the excitation inverter 48 through the second COR field control switch 66.

Figure 3:
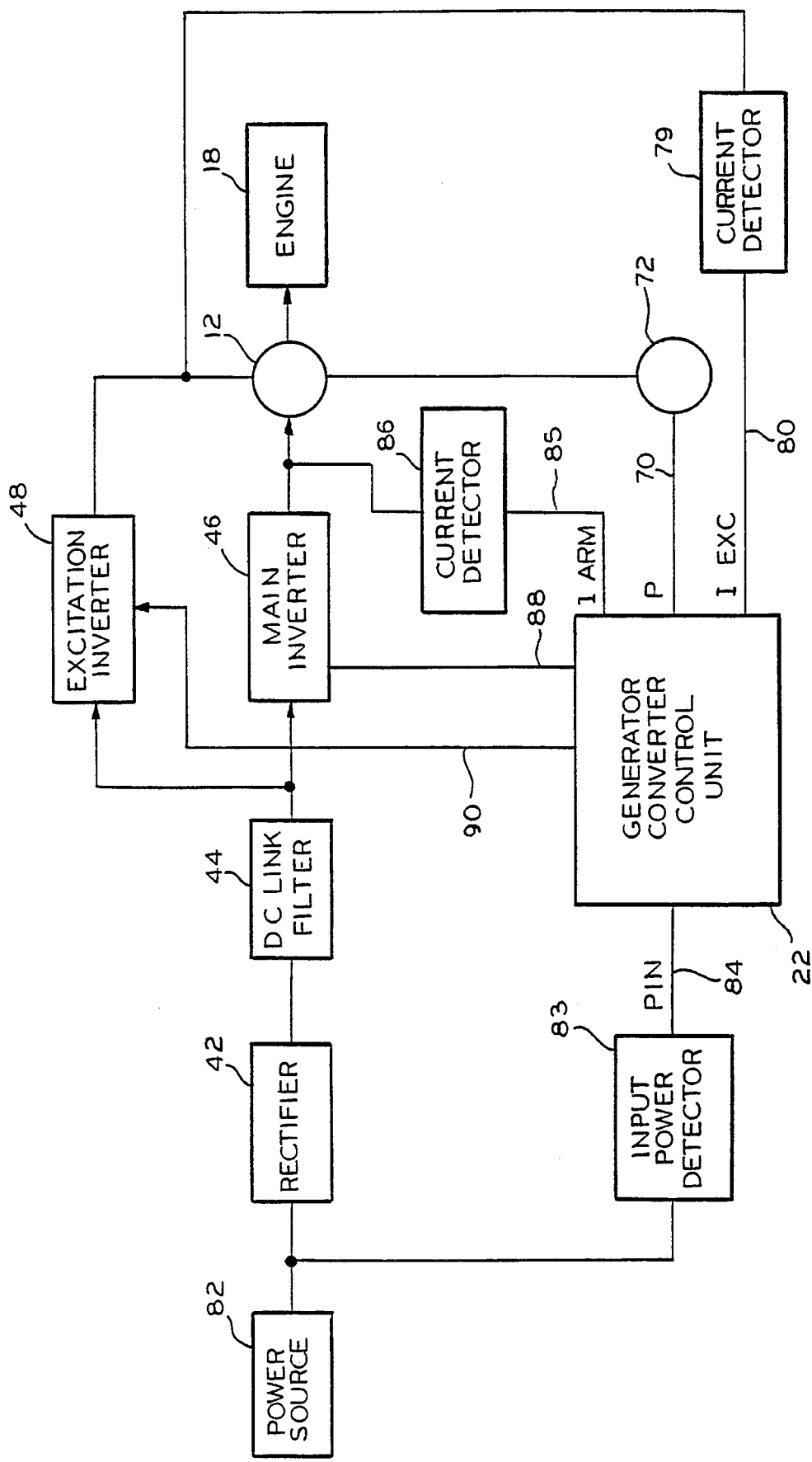
FIG. 3 is a block diagram of the control system specifically illustrating the start mode of operation.

Referring now to FIG. 3, a block diagram representation more specifically illustrates the operation of the electrical power system 10 according to the invention in the start mode of operation, as discussed immediately above. A power source 82 is coupled to the rectifier 42 which is coupled through the DC link and filter 44 to both the main inverter 46 and the excitation inverter 48. An input power detector 83 senses input power from the power source 82 and develops an input power level signal on a line 84 to the GCCU 22. The GCCU 22 also receives an armature current signal on a line 85 from a current detector circuit 86 which may be, for example, a current transformer which senses current from the main inverter 46 to the motor 12. The GCCU 22 also receive the position signal on the line 70 from the rotor position sensor 72 and the excitation current signal on the line 80 from the current detector 79. As discussed above, the GCCU 22 develops the base drive commands for the main inverter 46 on the line 88 and the base drive commands for the excitation inverter 48 on the line 90.

Figure 4:
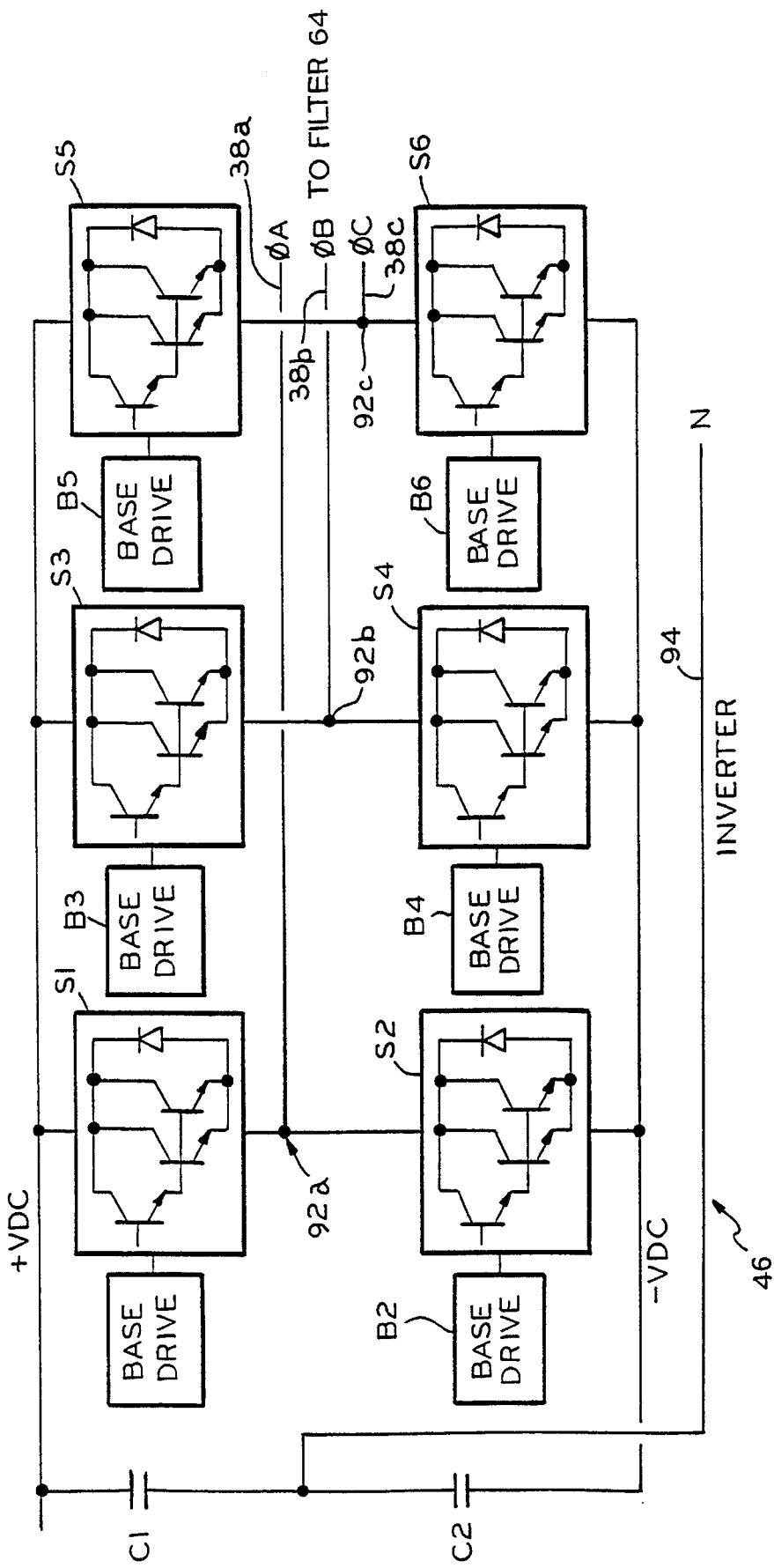
FIG. 4 is a schematic diagram illustrating the start inverter of FIG. 3.

Referring to FIG. 4, a schematic diagram illustrates one alternative circuit for the main inverter 46. Particularly, the inverter 46 is a voltage source inverter having six power switch circuits S1–S6. The six power switch circuits S1–S6 are connected in a 3-phase bridge configuration. Each of the power switch circuits S1–S6 is driven by an associated respective base drive circuit B1–B6. The base drive circuits B1–B6 are driven by the signals on the line 88 from the GCCU 22 in a conventional manner. The switch circuits S1–S6 are connected between the plus voltage DC rail and the minus voltage DC rail of the DC link filter 44. The 3-phase armature windings 34 of the main generator 12 are connected by the lines 38a–38c, respectively, to junctions 92a–92c between pairs of series-connected switch circuits S1–S6. A neutral line 94 to the main generator 12 is connected at a junction between filter capacitors C1 and C2 across the DC link filter 44.

Although not shown, the excitation inverter 48 may be of generally similar construction to the main inverter 46 illustrated in FIG. 4. Alternatively, other circuits may be utilized for either or both of the main inverter 46 and the excitation inverter 48, as is well known.

Figure 5:
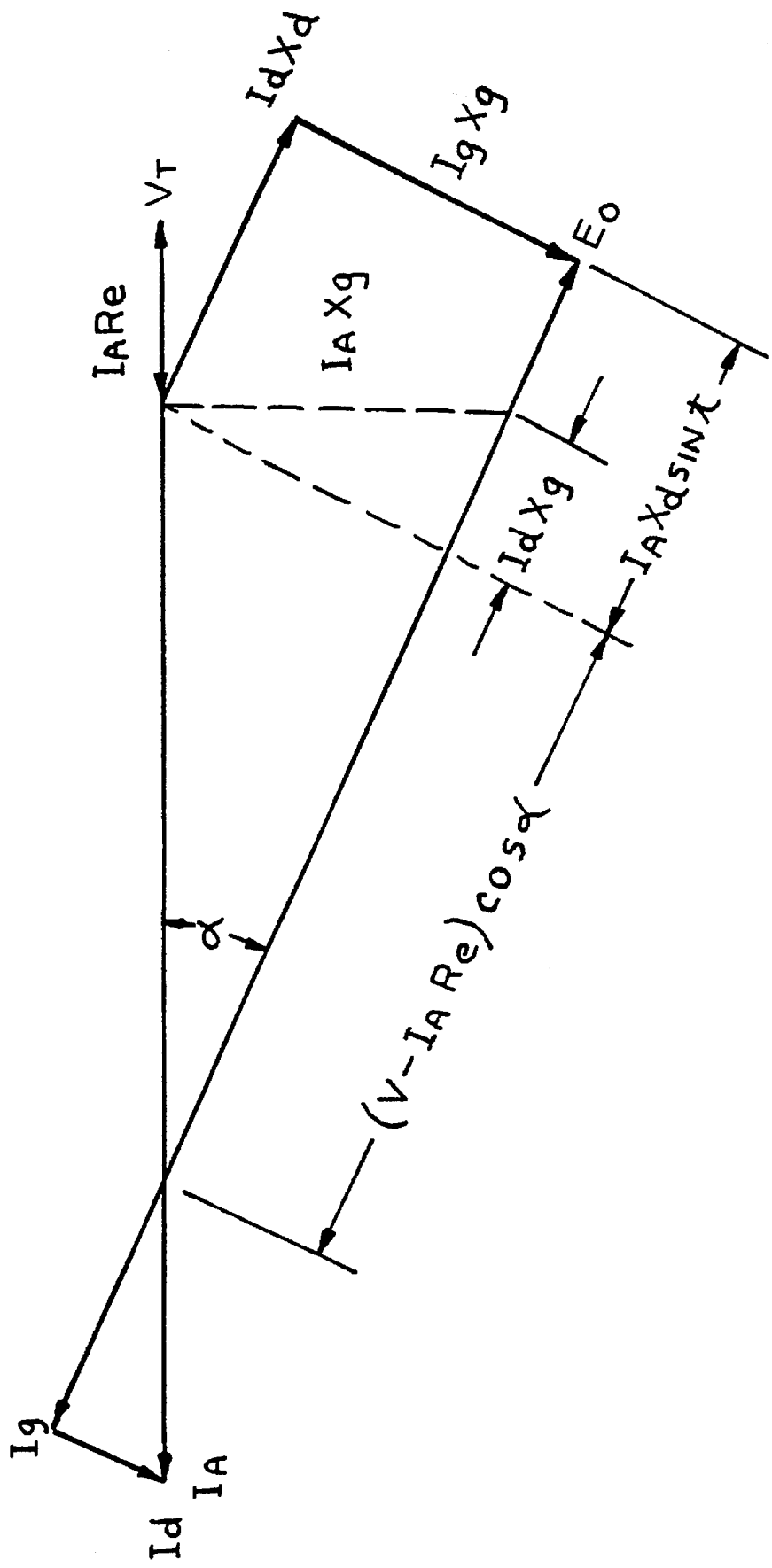
FIG. 5 is a vector diagram illustrating the desired relationship of various motor operation parameters according to the start control of the invention.

With reference to FIG. 5, a vector diagram illustrates operation of the motor 12 operating at unity power factor. Particularly, the vector diagram illustrates the basic relationship between motor terminal voltage $V_T$ and torque angle α. At unity power factor, the torque angle is equal to the commutation angle. More specifically, at unity power factor, the torque angle is determined in accordance with the following equation (1):

$$\alpha = arctg\left(\frac{I_d}{I_q}\right)$$

where:

$I_d$—direct component of the armature current $I_A$; and
$I_q$—quadrature component of the armature current $I_A$.
The terminal voltage per phase $V_T$ can be expressed with the following equation (2):

$$V_T = I_A \cdot R_e + \frac{I_A \cdot X_q}{tg(\alpha)}$$

where:

$I_A$—motor armature current (stator current);
α—torque angle (commutation angle);
$R_e$—resistance of armature per phase; and
$X_q$—quadrature axis synchronous reactance.
The quadrature axis synchronous reactance $X_q$ can be expressed in accordance with the following equation (3):

$$X_q = K_1 \cdot \omega \cdot L_q$$

where:

$$K_1 - Poles \frac{\pi}{60} \ ;$$

ω—motor speed, rpm; and $L_q$—quadrature axis synchronous inductance.
The voltage $V_T$ can be estimated utilizing the second and third equations (2) and (3).

Particularly, in accordance with an illustrative embodiment of the invention, feedback signals such as for the motor armature current $I_A$, the commutation angle (or torque angle) α and the motor speed are readily available. The constant $K_1$ is fixed depending on the number of poles in the motor 12. The armature resistance $R_e$ and quadrature axis synchronous inductance $L_Q$ are also predetermined, fixed characteristics of any given motor and therefore can be considered as constants relative to any particular motor.

Figure 6:
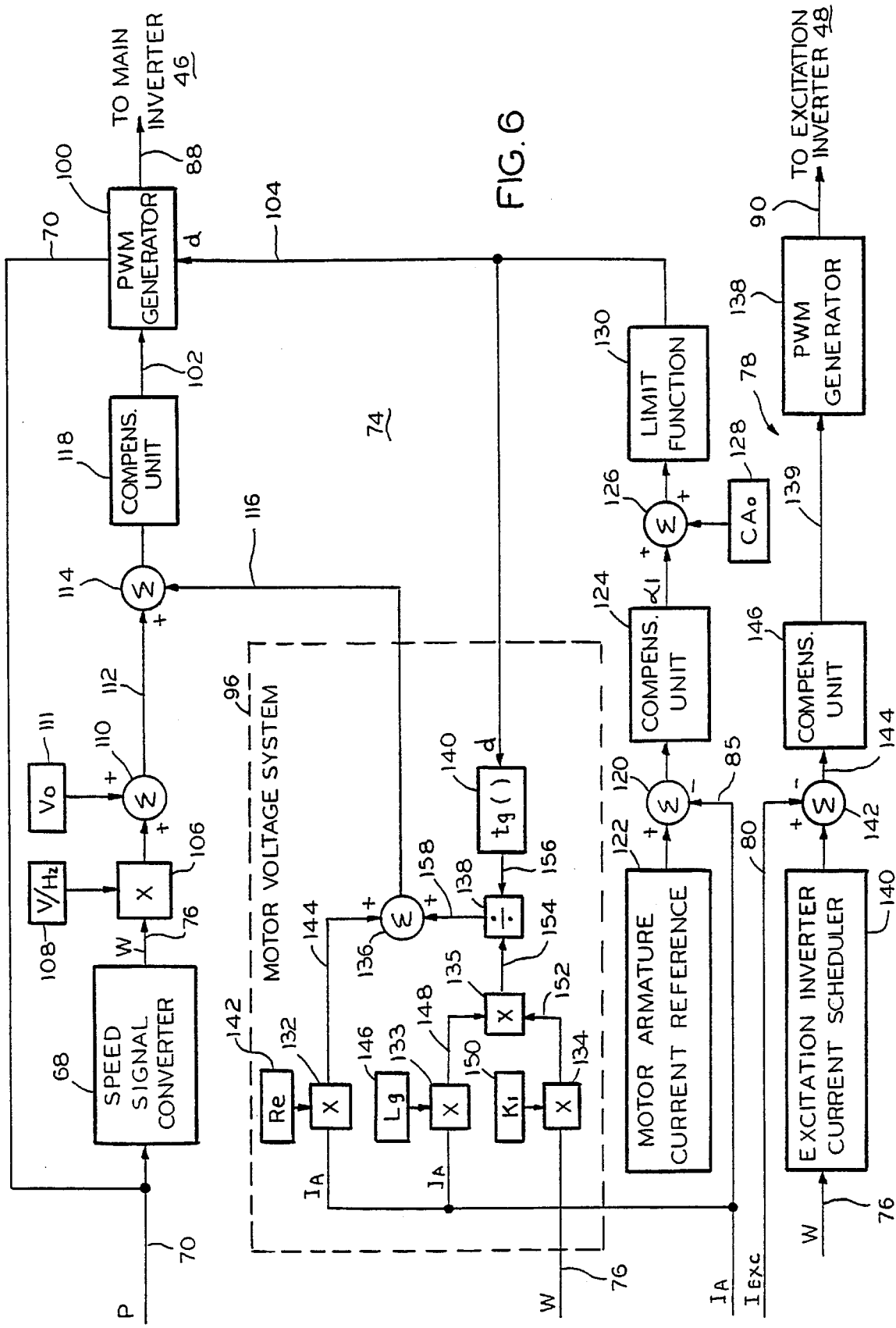
FIG. 6 is a detailed block diagram of the generator/convertor control unit (GCCU) of FIG. 3.

With reference to FIG. 6, a block diagram illustrates the implementation of the GCCU 22, see FIG. 3, according to the invention, including the main inverter control 74 (FIG. 2) and the excitation inverter control 78 (FIG. 2). More particularly, the main inverter control 74 includes a motor voltage estimator 96 (FIG. 6) according to the invention.

The main inverter control 74 includes a pulse width modulation (PWM) generator 100. The PWM generator 100 receives the position signal on the line 70, a voltage command on a line 102, and a commutation angle command on a line 104. The PWM generator 100 derives the base drive commands which are transferred on the line 88 to the base drive circuits B1–B6 of the main inverter 46, see FIG. 4. The PWM generator 100 may be of any conventional construction. Particularly, the PWM generator 100 develops base drive signals to control the output voltage of the main inverter 46, by varying the duty cycle of the PWM signals. The duty cycle is proportional to the voltage command received on the line 102. The fundamental frequency of the inverter output is determined by motor speed. The output wave forms are synchronized to the rotor position as determined by the sensor 72, see FIG. 3. The phase difference between rotor position and inverter output is adjusted in accordance with the commutation angle command on the line 104.

The voltage command on the line 102 is formed by converting the rotor position signal on the line 70 to a speed signal on the line 76 via the speed signal converter 68. A multiplier 106 multiplies the speed signal by a constant from a block 108. Particularly, the constant represents a desired volts/hertz ratio. A summer 110 receives the output from the multiplier 106 and a constant $V_O$, which is proportional to "boost" voltage, from a block 111. The boost voltage is required to offset the IR drop of the machine at low speed. The output of the summer 110 is a voltage reference on a line 112 to a second summer 114. The second summer 114 receives a voltage feedback signal on a line 116 from the motor voltage estimator 96. The second summer 114 produces a difference or error between the voltage reference and the estimated output voltage. The error from the second summer 114 is applied to a compensation unit 118, which output is the voltage command on the line 102. The compensation unit 118 provides stable operation in controlling motor voltage by utilizing, for example, a proportional and integral control algorithm.

In order to develop the commutation angle command on the line 104, the armature current $I_A$ on the line 85 is applied to a summer 120. The summer subtracts armature current $I_A$ from a motor armature current reference received from a block 122. The current reference value is selected to maintain a desired torque during engine starting.

The output of the summer 120 is an armature current error which is applied to a compensation unit 124. The compensation unit 124 provides stability in controlling current by utilizing, for example, a proportional and integral control algorithm. The compensation unit 124 may, if necessary, or desired, include disable logic which disables the output of the compensation unit 124 and initializes the integrator function during start-up. This prevents a wind-up condition of the integrator. Also, it is desirable to disable the control loop at very low speeds because the current sensed by the current detector 86 may be unreliable.

The output form the compensation unit 124 represents a desired commutation angle reference which is provided to a summer 126. Another input to the summer 126 is a constant $CA_O$ from a block 128, representing a minimum commutation angle. This is the commutation angle which is used at stall conditions and at speeds below the value determined by the disable logic of the compensation unit 124. Above this speed, the commutation angle is equal to the reference value determined by the compensation unit 124 plus the value $CA_O$. The output of the summer 126 is coupled to a limit function 130 which develops the commutation angle command on the line 104. The limit function 130 prevents the control system from operating in an unstable region, which can occur if the commutation angle command exceeds the maximum angle. This maximum angle is a function of speed and motor parameters.

The motor voltage estimator 96 includes four multipliers 132–135, a summer 136, a divider 138 and a tangent function 140. The motor voltage estimator 96 implements the second and third equations disclosed hereinabove.

Particularly, the first multiplier 132 receives the armature current $I_A$ on the line 85 and multiplies it by a constant from a block 142 representing armature resistance $R_e$ and develops the expression $I_A \cdot R_e$ which is output therefrom on a line 144 which is coupled to the summer 136. The second multiplier 133 also receives the armature current signal $I_A$ on the line 85 and multiplies it by the constant $L_q$ from a block 146 and develops the expression $I_A \cdot L_q$ on a line 148 which is applied to the fourth multiplier 135. The third multiplier 134 receives the speed signal on the line 76 from the speed signal converter 68 and multiplies it by the constant $K_1$ from a block 150 and develops an output representing the expression $\omega \cdot K_1$ on a line 152 which is also applied to the fourth multiplier 135. The output of the fourth multiplier 135 is determined in accordance with the expression $I_A \cdot L_q \cdot \omega \cdot K_1$ and is output on a line 154 which is coupled to the divider 138. Another input to the divider 138 is a signal from the tangent function 140 which receives the commutation angle command on the line 104 and outputs the tangent thereof on a line 156 to the divider 138. The output of the divider is applied to the summer 136. The output of the summer 136 is the estimated amplitude of the motor phase voltage on the line 116 which is determined in accordance with the second and third equations, combined. Particularly:

$$V_T = I_A \cdot R_e + \frac{I_A \cdot K_1 \cdot \omega \cdot L_q}{tg(\alpha)} .$$

The excitation inverter control 78 controls field current in the motor 12 and is controlled by varying the duty cycle of PWM signals from a PWM generator 138. Specifically, the PWM generator 138 develops the base drive command signals on the line 90 for controlling the excitation inverter 48, see FIG. 3. The duty cycle is proportional to a voltage reference which is applied to the PWM generator 138 on a line 139.

An excitation inverter current scheduler 140 stores a lookup table. The lookup table represents desired excitation current relative to motor speed, to maintain the field current at a preselected desired level. A curve representing desired excitation current is illustrated in the Rozman et al. copending application incorporated by reference herein.

The output of the current scheduler 140 is transferred to a summer 142 which subtracts the excitation current signal on the line 80, determined by the current detector 79, see FIG. 3, to develop an excitation current error on a line 144. The error on the line 144 is provided to a compensation unit 146 which contains a proportional integral algorithm, the output of which is the voltage reference on the line 139 to the PWM generator 138.

The operation of the GCCU 22 is as described below.

At the beginning of the start motoring mode of operation, i.e., the speed is zero, the commutation angle command on the line 104 is determined by the constant $CA_O$, since the compensation unit 124 is disabled by the disable logic, and the voltage command on the line 102 is equal to the boost voltage $V_O$. The excitation inverter current is determined by the scheduler 140 to maintain the field current at a preselected level. The PWM generator 100 begins to develop base drive commands to the main inverter 46 according to the initial rotor position. The interaction between the magnetic field established in the rotor and by the stator current causes movement of the main generator rotor. As speed increases, the commutation angle command on the line 104 is initially held constant while the voltage reference on the line 112 is increased proportionally to the volts/hertz ratio set at the block 108 to increase the duty cycle and speed up the motor. Particularly, the voltage reference on the line 112 is compared to the feedback on the line 116, representing an estimate of motor voltage, in order to develop the voltage command on the line 102 at the desired level to provide precise control of the synchronous motor 12.

The GCCU 22 described herein can be implemented with suitable electrical or electronic circuits, or with a software programmed control unit, as is obvious to those skilled in the art.

In accordance with the above, a start control for a motor provides precise control of a synchronous motor using control of output voltage in accordance with an estimate of the amplitude of the fundamental output voltage.

I claim:

1. A control system for a brushless machine having a rotor and a stator having a stator coil which is controllably energized from a source of DC power defining a positive and a negative DC voltage for imparting rotation to the rotor, comprising:

switching means coupled between the source of DC power and said stator coil for alternately applying the positive and negative voltage to said coil, said switching means defining an output voltage;

first means for generating an output voltage command;

second means for generating a commutation angle command;

first sensing means for sensing the speed of rotational movement of the rotor;

second sensing means for sending current through the stator coil;

means coupled to said second generating means and said first and second sensing means for developing an estimate of stator coil voltage responsive to said commutation angle command, said rotor speed and said stator current, said developing means including means for determining said stator coil voltage in accordance with the following equation:

$$V_T = I_A \cdot R_e + \frac{I_A \cdot K_1 \cdot \omega \cdot L_q}{tg(\alpha)},$$

where:

$I_A$—stator coil current;

$\alpha$—commutation angle command;

$R_e$—a constant representing stator coil resistance;

$K_1$ – no. of motor Poles $\frac{\pi}{60}$ (a constant);

$\omega$—motor speed, rpm; and $L_q$—a constant representing motor quadrature axis synchronous inductance; and control means coupled to said first and second generating means and said developing means for controlling said switching means so that said switching means develop an output voltage in accordance with said output voltage command, said commutation angle command and said voltage estimate.

2. In a control system for a variable speed motor provided with a source of excitation comprising a DC source and an inverter that supplies power of variable frequency and voltage to the motor, an inverter control comprising:

a current sensor for developing a signal representing the current from the inverter to the motor;

a speed sensor for developing a signal representing speed of the motor;

means for developing a signal representing torque angle of the machine operation;

means coupled to the current sensor, speed sensor, and the developing means, for generating a signal representing an estimation of motor voltage $V_T$, said generating means including means for determining said estimation of motor voltage $V_T$ in accordance with the equation $$V_T = I_A \cdot R_e + \frac{I_A \cdot K_1 \cdot \omega \cdot L_q}{tg(\alpha)},$$

where:

$I_A$—motor current;

$\alpha$—torque angle;

$R_e$—a constant representing stator coil resistance;

$K_1$ – no. of motor Poles $\frac{\pi}{60}$ (a constant);

$\omega$—motor speed, rpm; and $L_q$—a constant representing motor quadrature axis synchronous inductance; and control means coupled to the speed sensor, the generating means and the developing means for developing a pulse width modulated signal to control inverter frequency and voltage to maintain motor voltage at the desired operating level.

* * * * *